United States Patent
Herle et al.

(10) Patent No.: US 7,461,373 B2
(45) Date of Patent: Dec. 2, 2008

(54) APPARATUS AND METHOD FOR UPGRADING SOFTWARE OF A WIRELESS MOBILE STATION

(75) Inventors: Sudhindra P. Herle, Plano, TX (US); Bryan J. Moles, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 10/366,758

(22) Filed: Feb. 14, 2003

(65) Prior Publication Data

US 2004/0133887 A1 Jul. 8, 2004

Related U.S. Application Data

(63) Continuation-in-part of application No. 10/310,738, filed on Dec. 5, 2002.

(51) Int. Cl.
G06F 9/44 (2006.01)
H04M 3/00 (2006.01)

(52) U.S. Cl. .................. 717/171; 455/419
(58) Field of Classification Search ............ 717/171, 717/172; 719/331
See application file for complete search history.

(56) References Cited

U.S. PATENT DOCUMENTS 6,640,334 B1 * 10/2003 Rasmussen ............... 717/171
6,836,657 B2 * 12/2004 Ji et al. ...................... 455/419
6,999,976 B2 * 2/2006 Abdallah et al. ........... 707/200
2004/0098715 A1 * 5/2004 Aghera et al. ............. 717/173

OTHER PUBLICATIONS

Microsoft Computer Dictionary, third edition. Microsoft Press, copyright 1997 by Microsoft Corporation, p. 166.*

* cited by examiner

Primary Examiner—Eric B. Kiss

(57) ABSTRACT

A software upgrade server capable of upgrading a wireless mobile station via a wireless network. The software upgrade server comprises: 1) a database for storing a plurality of software upgrade files as a plurality of object files and a plurality of image files suitable for use in the wireless mobile station; and 2) an upgrade controller associated with the database for communicating with the mobile station via the wireless network. The upgrade controller receives from the mobile station a select message selecting one of the software upgrade files and a target address associated with an original image file in a memory of the mobile station. The upgrade controller links selected object files to form a dynamically linked library (DLL) file based on the target address. The upgrade controller retrieves from the database a copy of the original image file and generates a delta file corresponding to differences between the original image file and the DLL file and transmits the delta file to the wireless mobile station.

24 Claims, 5 Drawing Sheets

APPARATUS AND METHOD FOR UPGRADING SOFTWARE OF A WIRELESS MOBILE STATION

CROSS-REFERENCE TO RELATED APPLICATION

This application is a continuation-in-part (CIP) of U.S. patent application Ser. No. 10/310,738, filed on Dec. 5, 2002 and entitled "APPARATUS AND METHOD FOR REMOTE DLL LINKING OF SOFTWARE UPGRADES FOR A WIRELESS MOBILE STATION". The disclosure of related patent application Ser. No. 10/310,738 is hereby incorporated by reference into the present disclosure as if fully set forth herein.

TECHNICAL FIELD OF THE INVENTION

The present invention is directed generally to wireless communication systems and, more specifically, to an apparatus and method for upgrading the software in a wireless mobile station.

BACKGROUND OF THE INVENTION

In order to increase the wireless market to the greatest extent possible, wireless service providers and wireless equipment manufacturers constantly seek new ways to make wireless equipment and services as convenient, user-friendly, and affordable as possible. To that end, wireless service providers and the manufacturers of cell phones and other wireless mobile stations frequently work together to streamline procedures for enrolling and equipping new subscribers and for improving the services and equipment of existing subscribers.

One important aspect of these efforts involves over-the-air (OTA) provisioning and upgrading of wireless mobile stations, such as cell phones, wireless personal digital assistants (PDAs), wireless hand-held computers, two-way pagers, and the like. OTA provisioning is a relatively new feature that enables a new subscriber who purchases a new cell phone (or other mobile station) to set-up an account with a wireless service provider and to configure the phone for operation. The OTA provisioning procedure is mostly automated and does not require the new subscriber to visit a cell phone service center. Typically, the new subscriber removes the new cell phone from its box, calls a special purpose telephone number (given in the instructions), and performs an interactive provisioning procedure with an automated agent or a human service representative.

Over-the-air upgrading of wireless mobile stations also is a relatively new procedure that enables a subscriber to download and install upgraded software containing patches, bug fixes, and newer versions of mobile station software, including the operating system. The wireless service provider or the mobile station manufacturer, or both, may provide the upgraded software.

It has long been possible to download and to install software upgrades for a personal computer (PC) via the Internet. However, this process is considerably more complicated in a mobile station. A personal computer has far more resources available to perform a software upgrade, including dynamically linked libraries (DLLs), a memory management unit (MMU), and a large random access memory (RAM) space. A conventional PC software upgrade may be partitioned and downloaded to a personal computer as a group of shared objects. If one object file is corrupted or interrupted during transmission, only that object file needs to be re-transmitted. The object files that are properly received do not need to be re-transmitted. Once all object files are present, the memory management unit (MMU) of the PC loads all of the object files into RAM and re-links the object files to form a DLL. The DLL may then be stored back into ROM (i.e., disk) in the PC. During this process, the MMU is capable of modifying portions of the code or the symbol table.

However, a wireless mobile station (e.g., a cell phone) typically has far fewer resources available than a PC. Mobile stations lack a memory management unit and code is not executed from RAM. Code is executed out of a Flash memory that acts as a read-only memory (ROM). The Flash memory generally cannot be written to, it can only be re-programmed with great difficulty. These resource limitations greatly complicate software upgrade operations in wireless mobile stations.

Therefore, there is a need in the art for improved systems and methods for performing automatic software upgrades of wireless handsets and other types of mobile stations. In particular, there is a need in the art for systems and methods for performing over-the-air software upgrades that permit the use of methods similar to dynamic linking libraries (DLLs) in the mobile station handset.

SUMMARY OF THE INVENTION

To address the above-discussed deficiencies of the prior art, it is a primary object of the present invention to provide a mobile station capable of being upgraded by a delta file received from a software upgrade server via a wireless network. According to an advantageous embodiment of the present invention, the mobile station comprises: 1) a memory capable of storing an original image file and the delta file, wherein the delta file is suitable for upgrading the original image file; and 2) a controller associated with the memory capable of communicating with the software upgrade server via the wireless network. The controller receives at least a first message from the software upgrade server identifying an upgraded image file corresponding to the original image file. The controller, in response to the first message, transmits to the software upgrade server a target address in the memory associated with the original image file. The controller is further capable of modifying the original image file according to instructions stored in the delta file to thereby generate the upgraded image file in the memory.

It is another primary object of the present invention to provide a software upgrade server capable of upgrading a wireless mobile station via a wireless network. According to an advantageous embodiment of the present invention, the software upgrade server comprises: 1) a database capable of storing a plurality of software upgrade files as a plurality of object files and a plurality of image files suitable for use in the wireless mobile station; and 2) an upgrade controller associated with the database capable of communicating with the mobile station via the wireless network. The upgrade controller receives from the mobile station a select message selecting one of the plurality of software upgrade files and a target address associated with an original image file in a memory of the mobile station. The upgrade controller, in response to receipt of the target address, links selected ones of the plurality of object files to form a dynamically linked library (DLL) file based on the target address. The upgrade controller retrieves from the database a copy of the original image file and generates a delta file corresponding to differences between the original image file and the DLL file and transmits the delta file to the wireless mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
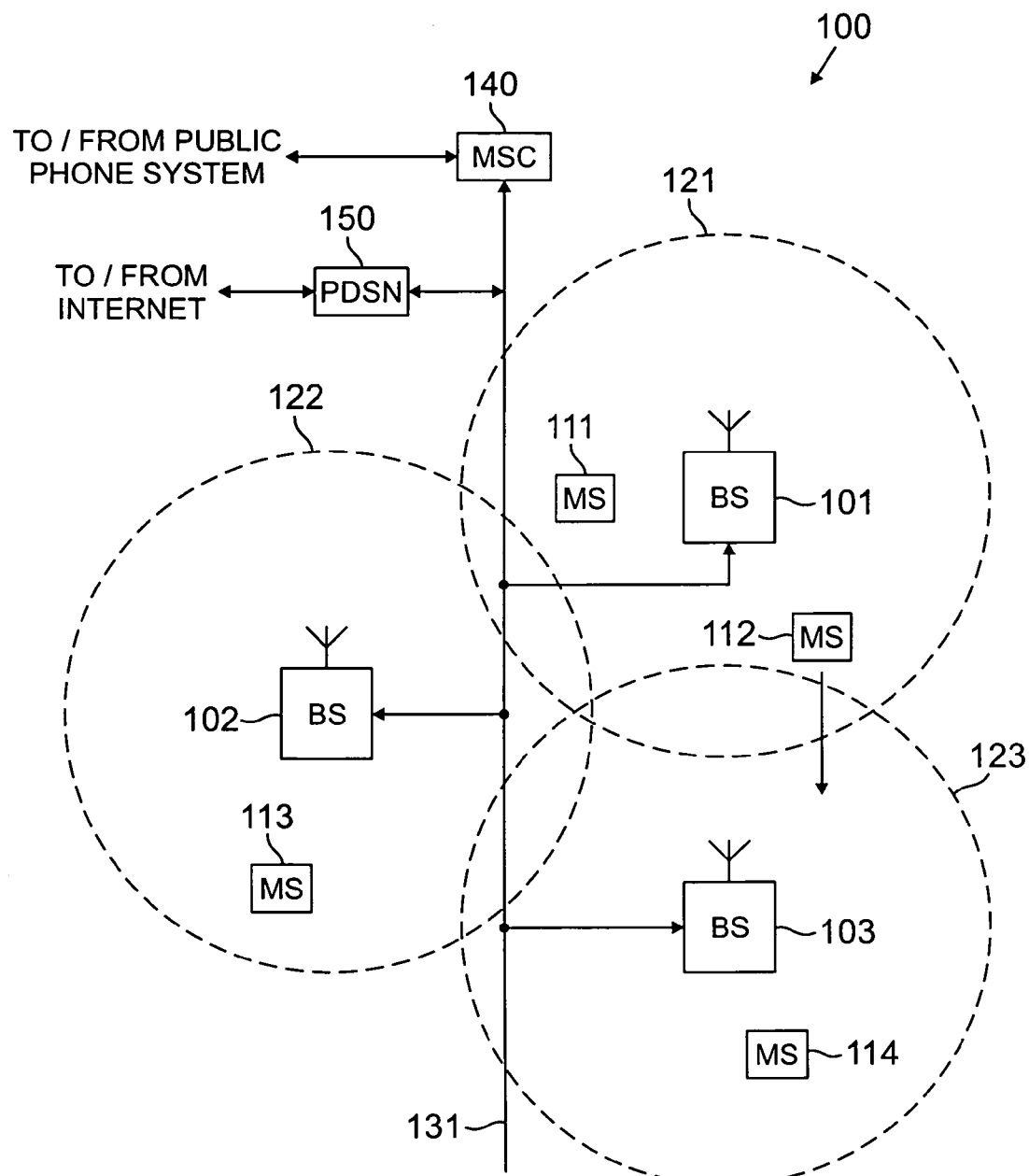
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical power supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC 140. BS 101, BS 102 and BS 103 also transfer data signals, such as packet data, with the Internet (not shown) via communication line 131 and packet data server node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cells sites of a mobile station that is communicating in the control or paging channel.

Figure 3:
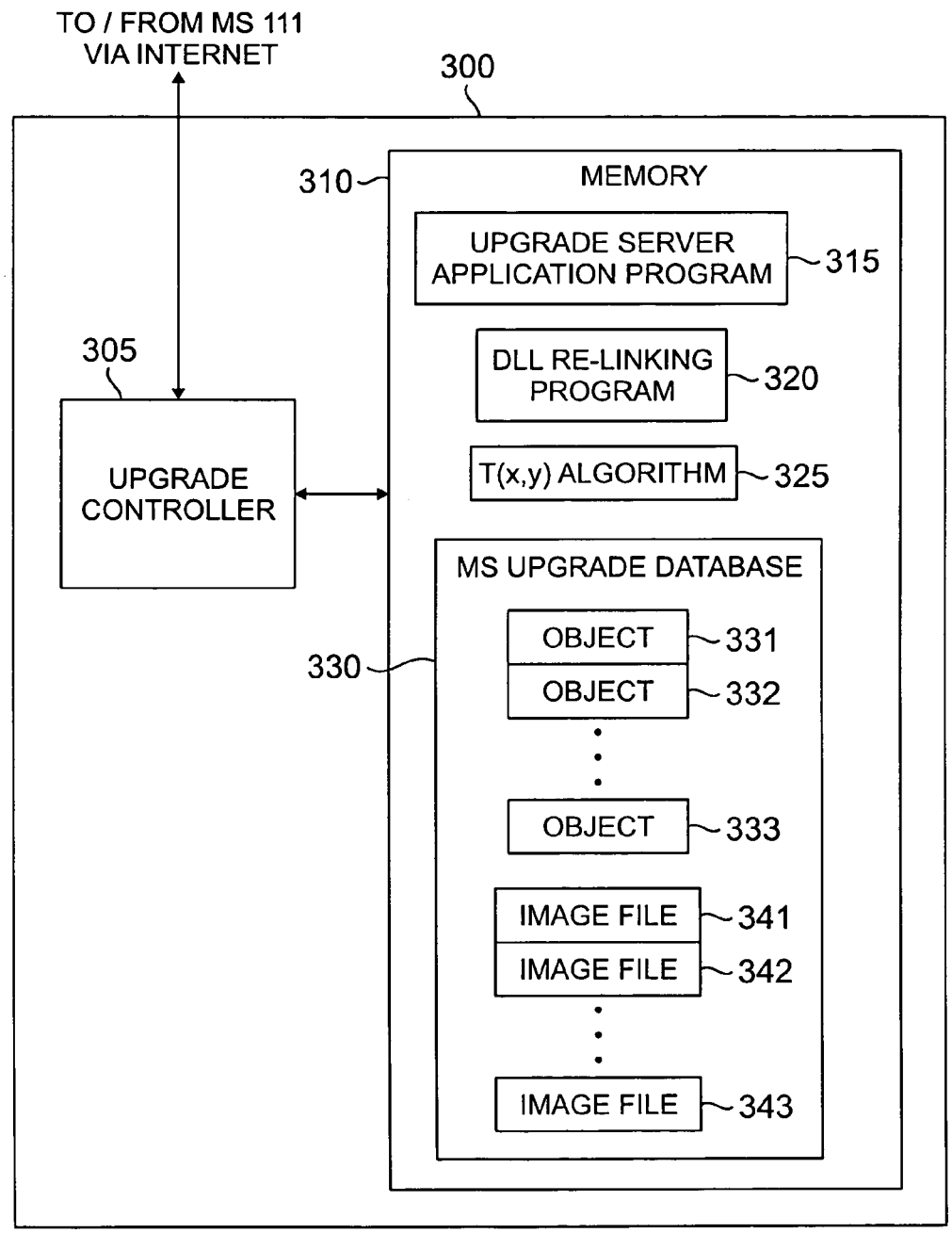
FIG. 3 illustrates an exemplary upgrade server according to one embodiment of the present invention.

Any or all of the mobile stations in wireless network 100 may be upgraded by means of an over-the-air (OTA) upgrade procedure that transfers new software to the mobile stations from remote upgrade server 300 shown in FIG. 3. According to the principles of the present invention, upgrade server 300 provides a selected mobile station, for example MS 111, with the resources that are available to a personal computer, but normally lacking in a cell phone or similar mobile station. In particular, upgrade server 300 receives a target address in memory from a mobile station (e.g., MS 111) and, in response, uses the target address to remotely link a group of shared objects associated with a particular software upgrade to form a dynamically linked library (DLL). The DLL file is then transmitted over the air for the mobile station and is loaded into memory at the target address. In this manner, the intense processing associated with re-linking a DLL is performed remotely rather than in the mobile station.

According to an advantageous embodiment of the present invention, the initial upgrade of a mobile station (e.g., MS 111) and subsequent smaller upgrades may be performed by means of a delta file. In such an embodiment, upgrade server 300 transmits a delta file ($d_{xy}$) to the mobile station. The mobile station executes a software algorithm that reads instructions and data from the delta file. The software algorithm modifies, for example, the existing operating system software to produce a new (or upgraded) version of the operating system software. In this advantageous embodiment, the present invention downloads a small delta file over the air to the mobile station, rather than a large image file, thereby conserving network bandwidth.

The generation of a delta file involves two tasks: 1) a utility application generates the smallest possible binary difference ("delta file") between two versions of mobile station executable firmware; and 2) a software algorithm running on the mobile station receives the binary delta file as input and applies it to the existing image file on the mobile station to transform the existing image file into a new image file.

For example, let $I_o$ be the old image (e.g., revision 1.0) and let $I_N$ be the new image (e.g., revision 1.1). T(x,y) is the utility application that takes two images x and y and produces a delta file, $d_{xy}$. $P(d_{xy}, x)$ is the software algorithm that takes the delta, $d_{xy}$, and an image x, and reconstructs the new image file y. The new image file y is a bit exact copy of the original image file y used by T(x,y).

The present invention comprises the following steps:

1) Compute $d_{xy}$=T($I_O$, $I_N$) on a host workstation or server;
2) Send $d_{xy}$ over the air to the mobile station. For typical cases, the size of $d_{xy}$ is much smaller than size of $I_N$.
3) Execute the software algorithm $P(d_{xy}, I_o)$ on the phone. The output of $P(d_{xy}, I_o)$ is the bit exact representation of image $I_N$.

Figure 2:
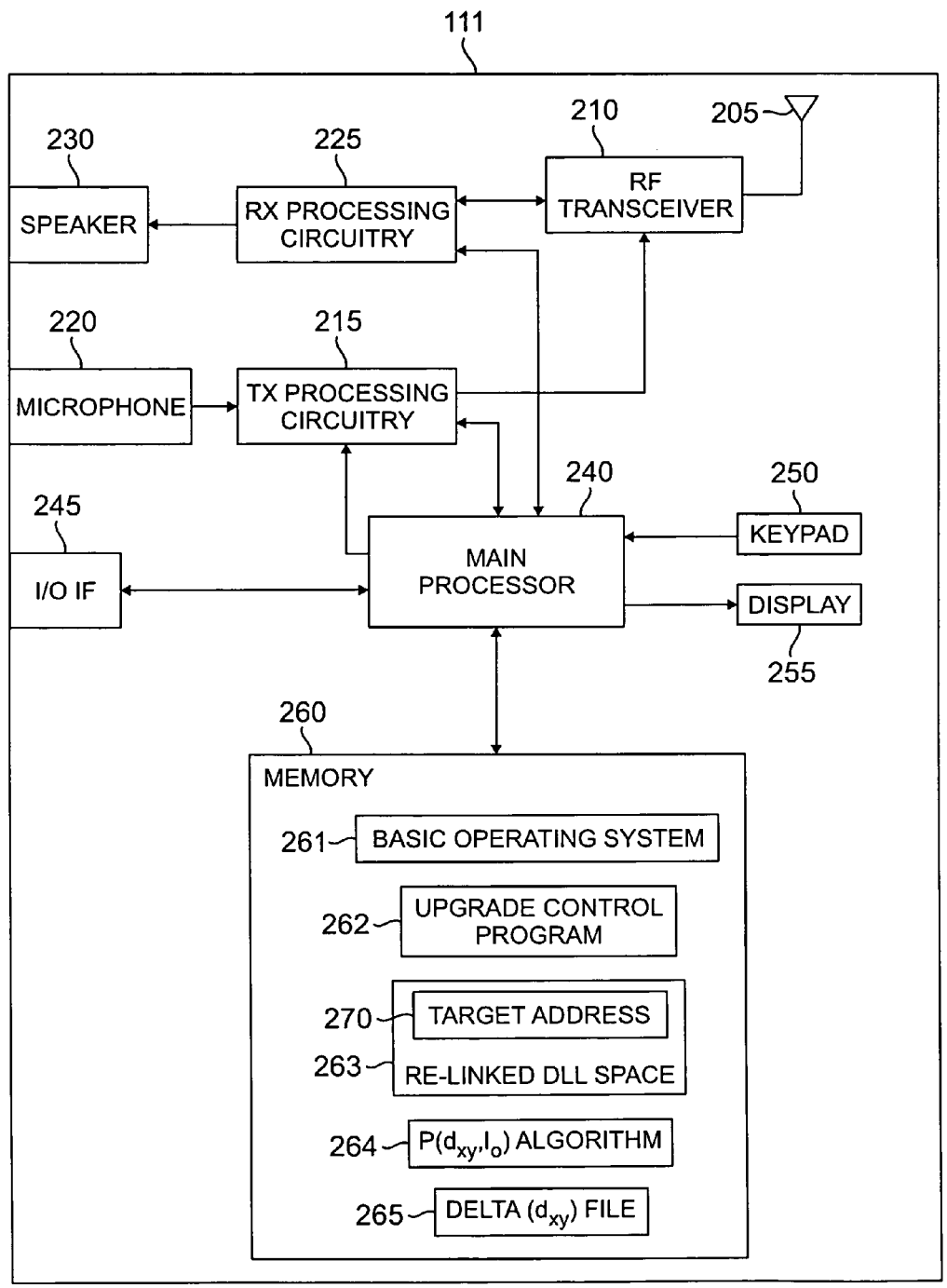
FIG. 2 illustrates an exemplary mobile station in greater detail according to one embodiment of the present invention.

FIG. 2 illustrates wireless mobile station 111 according to an advantageous embodiment of the present invention. Wireless mobile station 111 comprises antenna 205, radio frequency (RF) transceiver 210, transmit (TX) processing circuitry 215, microphone 220, and receive (RX) processing circuitry 225. MS 111 also comprises speaker 230, main processor 240, input/output (I/O) interface (IF) 245, keypad 250, display 255, and memory 260. Memory 260 further comprises basic operating system (OS) program 261, upgrade control program 262, re-linked DLL space 263, $P(d_{xy}, I_O)$ algorithm program 264, and delta ($d_{xy}$) file 265. Re-linked DLL space 263 begins at target address 270. A DLL received in an over-the-air (OTA) upgrade procedure is stored in memory 260 beginning at target address 270.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal to produce a processed baseband signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In an advantageous embodiment of the present invention, main processor 240 is a microprocessor or microcontroller. Memory 260 is coupled to main processor 240. According to an advantageous embodiment of the present invention, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of wireless mobile station 111. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides mobile station 111 with the ability to connect to other devices such as laptop computers and handheld computers. I/O interface 245 is the communication path between these accessories and main controller 240.

Main processor 240 is also coupled to keypad 250 and display unit 255. The operator of mobile station 111 uses keypad 250 to enter data into mobile station 111. Display 255 may be a liquid crystal display capable of rendering text and/or at least limited graphics from web sites. Alternate embodiments may use other types of displays.

In accordance with the principles of the present invention, main processor 240 is capable of receiving and installing software upgrades under the control of upgrade control program 262. This over-the-air (OTA) upgrade may be performed in one of two ways. In a first OTA procedure, if the upgraded program is entirely new to MS 111, or is radically different than a previous version, the entire upgraded program may be remotely linked in upgrade server 300 and then transmitted in its entirety to MS 111. Alternatively, in a second OTA procedure, if the upgraded program differs from an existing program already installed in MS 111 by a relatively small amount, delta files may be used.

In this second procedure, the upgraded program is remotely linked in upgrade server 300, and a difference detection program is used to determine the differences between the upgraded program and the previous version of that program that is already installed in MS 111. Upgrade server 300 then generates one or more delta files based on the detected differences between the two programs. Finally, only the one or more delta files are transmitted to MS 111.

The above-described OTA upgrade procedures may be initiated in any conventional triggering event, such an operator-initiated action, an automated periodic procedure (i.e., expiration or a timer in MS 111), or receipt of a notification message from upgrade server 300. The notification message may include a Short Messaging Service (SMS)-based OTA notification. In response to any of these triggering events, main processor 240 establishes a communication link to wireless network 100 and to server 300 via the Internet connection of wireless network 100.

When the communication link is established, main processor 240 requests a list of available upgrades for a mobile station of its type. Upgrade server 300 responds with a list of upgrade programs and the resource needs (i.e., memory space, processor speed) of those upgrade programs. Alternatively, when the communication link is established, upgrade server 300 may simply tell main processor 240 that a software upgrade file is available and ready to be transmitted.

Main processor 240 then selects a desired upgrade program (with operator approval, if necessary) and determines a contiguous space in memory 260 that is large enough to hold the selected upgrade program. In FIG. 2, this space is re-linked DLL space 263, which begins at target address 270. Main processor 240 notifies upgrade server 300 (shown in FIG. 3) of the identity of the selected upgrade program and also notifies upgrade server 300 that the DLL is to be stored at target address 270.

FIG. 3 illustrates exemplary upgrade server 300 according to one embodiment of the present invention. Upgrade server 300 comprises upgrade controller 305 and memory 310. Memory 310 stores application programs and data associated with the operation of upgrade server 300, including upgrade server application program 315, dynamic linking library (DLL) re-linking application program 320, T(x,y) utility algorithm program 325, and mobile station (MS) upgrade database 330. MS upgrade database 330 comprises a plurality of object files, including exemplary object files 331, 332, and 333, and a plurality of image files associated with mobile station 111, including exemplary image files 341, 342, and 343. As will be explained below in greater detail, T(x,y) utility algorithm program 325 and image files 341, 342 and 343 are used in connection with the generation of delta files that are capable of upgrading MS 111.

Upgrade controller 305 operates under the control of upgrade server application program 315 to provide software upgrade services for mobile stations in wireless network 100. Upgrade server application program 315 communicates with main processor 240 in MS 111. Upgrade server application program 315 receives requests for upgrades from MS 111 and identifies in MS upgrade database 330 available upgrades according to the vendor and model of MS 111, or some similar criteria. Upgrade server application program 315 also receives target address 270 from MS 111 and, in response, launches DLL re-linking program 320. DLL re-linking program 320 identifies selected ones of the object files in MS upgrade database that are associated with the software upgrade requested by MS 111. DLL re-linking program 320 then uses target address 270 to re-link the identified object files into a DLL file. If the DLL file for an entirely new program (i.e., not already resident in MS 111), then the DLL file is transferred to upgrade controller 305, which relays the DLL file to MS 111 for an OTA download.

Figure 4:
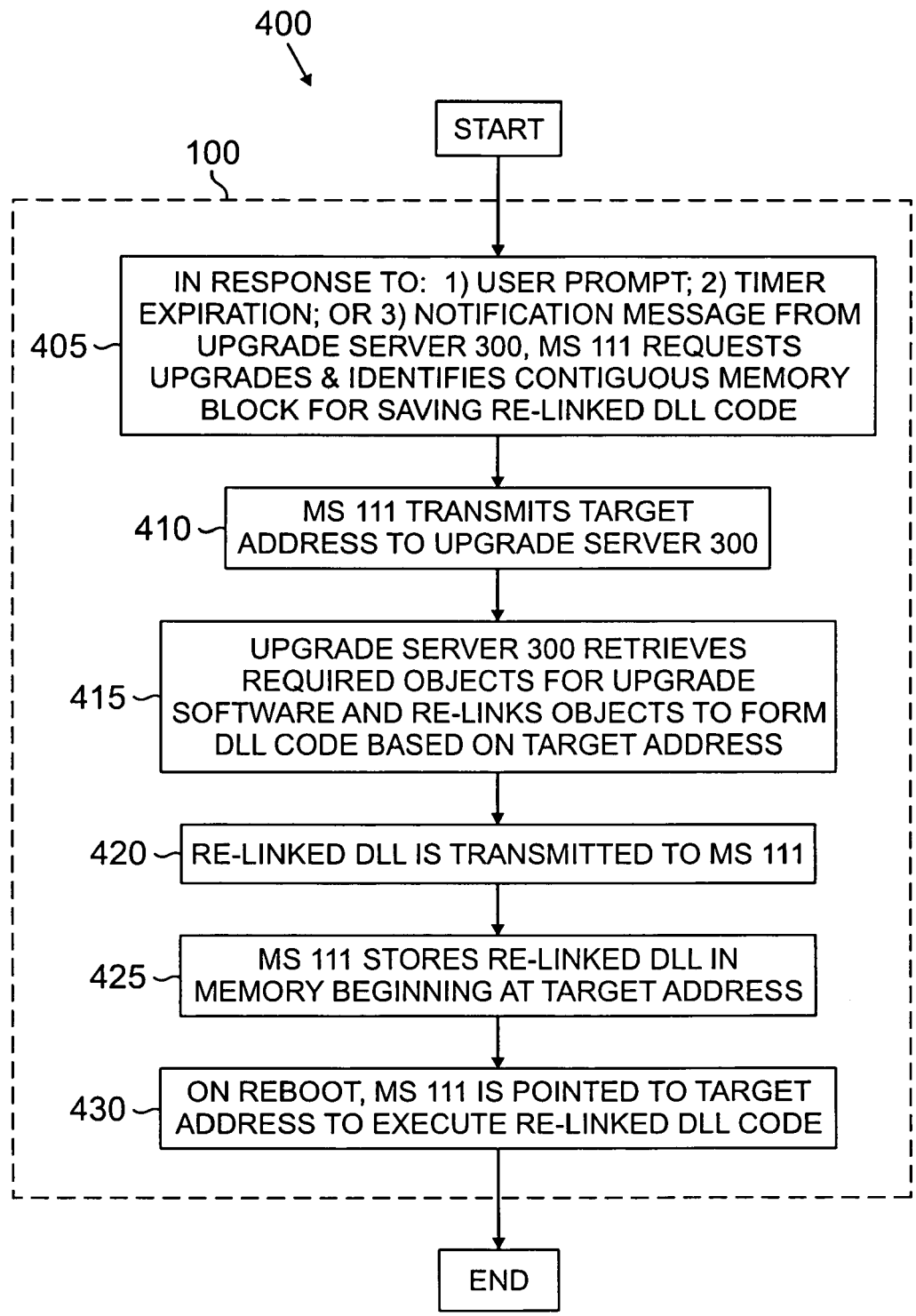
FIG. 4 is a flow diagram illustrating an upgrade operation of a mobile station according to a first exemplary embodiment of the present invention.

FIG. 4 depicts flow diagram 400, which illustrates an upgrade operation of MS 111 according to an exemplary embodiment of the present invention. In response to one or more of: 1) a user prompt; 2) a timer expiration; or 3) a notification message from upgrade server 300, MS 111 requests and receives from upgrade server 300 information regarding available software upgrades. In response, MS 111 identifies a suitable contiguous block of memory 260 (i.e., flash memory) for saving the re-linked DLL code (process step 405).

MS 111 then transmits target address 270 to upgrade server 300 (process step 410). Upgrade server 300 retrieves the required object files for the requested upgrade software and re-links the object files to form a DLL based on target address 270 (process step 415). Next, the re-linked DLL is transmitted to MS 111 (process step 420). MS 111 re-programs the flash memory and stores the re-linked DLL file in memory 260 beginning at target address 270 (process step 425). On reboot, MS 111 is pointed to target address 270 to execute the re-linked DLL code (process step 430).

In the foregoing description, it is assumed that the target address is the starting point of the available memory space in memory 260. This is not strictly necessary, however. Those of ordinary skill in the art will recognize that upgrade server 300 and MS 111 may readily be modified to operate with a target address located at the end, or at an intermediate point in the available memory space. In such alternate embodiments, upgrade server 300 can use the end point (or intermediate point) and the file size to calculate the starting point in memory 260 where the DLL must be located. Upgrade server 300 then uses the calculated starting point to link the DLL file.

As noted above, if the upgraded program differs from an existing program installed in MS 111 by a relatively small amount, delta files may be used. According to the principles of the present invention, upgraded software is sent to mobile station 111 in the form of delta ($d_{xy}$) file 265 that is stored in memory 265. Next, P($d_{xy}$, $I_O$) algorithm program 264 takes delta file 265 as its input and applies it to an original image file, $I_O$, that is already installed on MS 111 to produce a new image file, $I_N$. For example, the $I_O$ image file to be upgraded may be the application program residing in re-linked DLL space 263, beginning at target address 270. An upgrade is accomplished by executing P($d_{xy}$, $I_O$) algorithm program 264 from Flash memory and modifying the application program residing in re-linked DLL space 263 according to data and instructions in delta ($d_{xy}$) file 265 to produce an upgraded image file, $I_N$. Thereafter, MS 111 executes the upgraded version of the application program residing in re-linked DLL space 263.

The generation of delta files, such as delta file 265, is accomplished in upgrade server 300 by comparing the differences between the upgraded program, such as the remotely linked DLL file, and the previous version of the same program that is known to reside in MS 111. Upgrade server application program 315 receives requests for upgrades from MS 111 and/or informs MS 111 that an upgrade is available. Upgrade server application program 315 identifies available upgrades in MS upgrade database 330 according to the vendor and model of MS 111, or some similar criteria.

Upgrade server application program 315 also receives the current version number of a software application on MS 111. Upgrade server application program 315 uses the current version number to identify an original (or current) image file ($I_O$) that is already installed in MS 111 and a new (or upgraded) image file ($I_N$) in MS upgrade database 330. According to the principles of the present invention, the original image file ($I_O$) may comprise a DLL file that was previously linked in upgrade server 300 and transmitted to MS 111. Additionally, the new (or upgraded) image file ($I_N$) may be formed by linking two or more object files 331-333 as described above in FIG. 4. In this regard, MS 111 may transmit target address 270 of the original image file ($I_O$) in re-linked DLL space 263. Upgrade server 300 may then use target address 270 to identify the corresponding original image file ($I_O$) stored in MS upgrade database 330.

Upgrade server application program 315 then executes T(x,y) utility algorithm program 325 on $I_O$ and $I_N$ to produce delta file ($d_{xy}$) file 265 for transmission to MS 111. Since target address 270 is the same for $I_O$ and $I_N$, upgrade server application program 315 uses target address 270 to generate delta file 265. Delta file 265 is transferred to upgrade controller 305, which relays delta file 265 to MS 111 for an OTA download.

Figure 5:
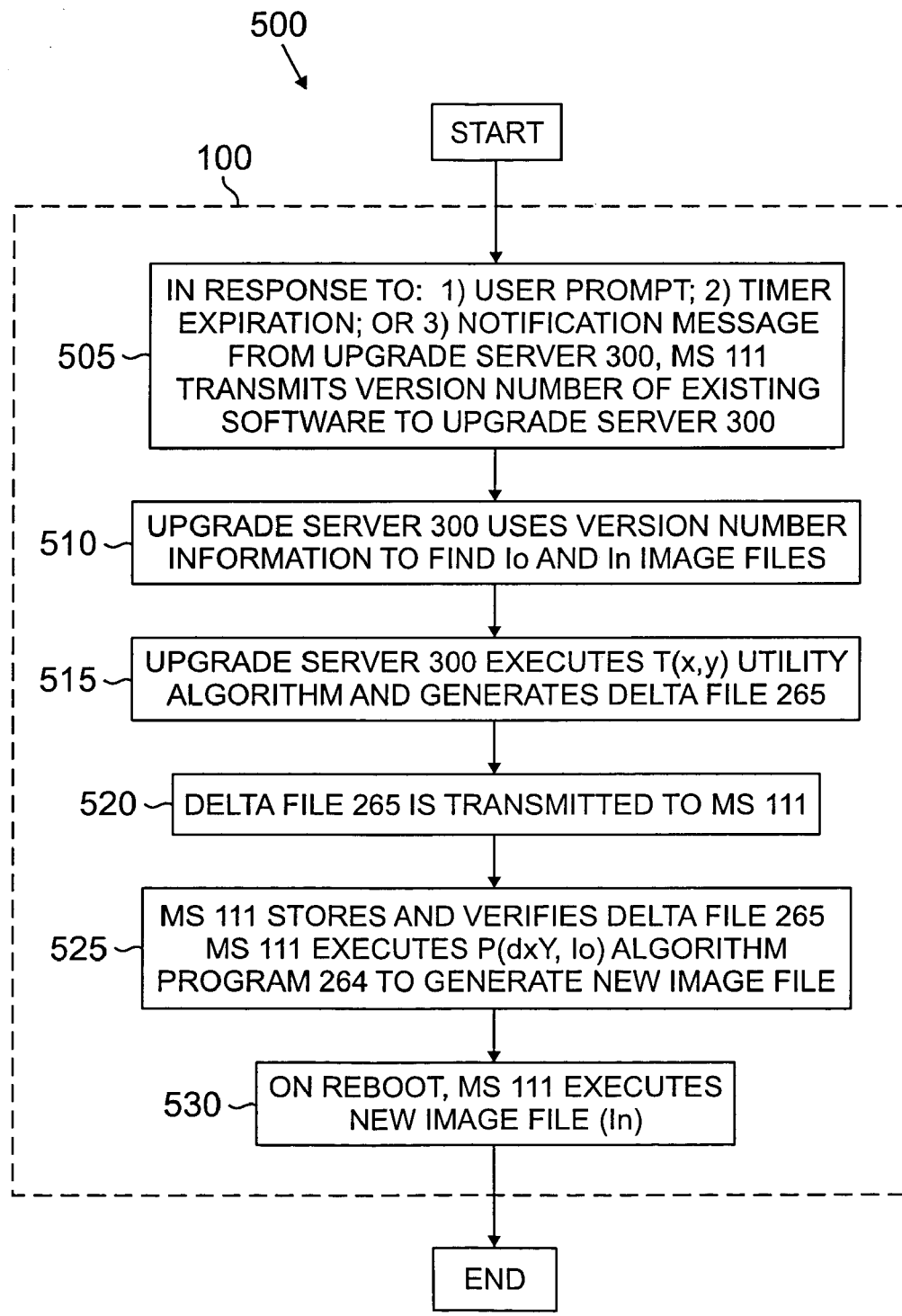
FIG. 5 is a flow diagram illustrating an upgrade operation of a mobile station according to a second exemplary embodiment of the present invention.

FIG. 5 depicts flow diagram 500, which illustrates an upgrade operation of mobile station 111 via wireless network 100 according to an exemplary embodiment of the present invention. In response to one or more of: 1) a user prompt; 2) a timer expiration; or 3) a notification message from upgrade server 300, MS 111 transmits to upgrade server 300 information regarding the version number of existing software programs in MS 111 (process step 505). This information includes target address 270 for each such software program. Upgrade server 300 uses the version information and target address 270 to search MS upgrade database 330 and fetch the original image file, $I_O$. Upgrade server 300 also searches for a new (or upgrade) image file, $I_N$, corresponding to the original image file, $I_O$, for that particular type of mobile station (process step 510).

Next, upgrade server 300 executes T(x,y) utility algorithm program 325 with x=$I_O$ and y=$I_N$ as inputs. The output is delta ($d_{xy}$) file 265 (process step 515) Optionally, in situations in which MS 111 does not already contain P($d_{xy}$, $I_O$) algorithm program 264, upgrade server 300 may add P($d_{xy}$, $I_O$) algorithm program 264 to delta file 265 in order to carry out the upgrade. Delta file 265 is then transmitted to MS 111 (process step 520). MS 111 receives delta file 265 and stores it in temporary non-volatile memory (i.e, Flash memory). Since the size of delta file 265 generally is very small compared to the size of either the $I_O$ image file or the $I_N$ image file, this does not present a memory problem.

After the entire delta ($d_{xy}$) file 265 is downloaded, MS 111 verifies delta ($d_{xy}$) file 265 for integrity, using MD5, HMAC-MD5, or some similar check-sum algorithm. Subsequently, MS 111 executes P($d_{xy}$, $I_O$) algorithm program 264. The original image file, $I_O$, is already present on MS 111. Execution of P($d_{xy}$, $I_O$) algorithm program 264 transforms the original image file, $I_O$ (i.e., operating system program 261), into an exact copy of the new image, $I_N$ (process step 525). After reboot, MS 111 executes the new (or upgraded) image file (process step 530).

According to an exemplary embodiment of the present invention, delta ($d_{xy}$) file 265 may contain the following essential information:

1) A cryptographic secure checksum of the new image $I_N$, which is verified after P($d_{xy}$, $I_O$) algorithm program 264 completes its operation;

2) The final size of $I_N$; and

3) Instructions to transform the old image file, $I_O$, into the new image file, $I_N$.

The instructions in delta ($d_{xy}$) file 265 may be, for example:

a) Add M bytes of literal data at offset N;

b) Copy data from original image at offset M to new offset N; and/or c) Delete N bytes of data at offset M.

Optionally, delta ($d_{xy}$) file 265 may be compressed to further reduce the OTA transfer size using any of a number of conventional algorithms, including LZW, GZIP, BZIP2, RLE, ZIP, and the like.

Alternatively, delta ($d_{xy}$) file 265 may be downloaded to a personal computer (PC) via the internet and MS 111 may be re-programmed via the serial port and special customer support software running on the PC. This alternative allows mass updates of software quickly and easily, since the entire software need not be programmed—only a small delta file.

Although the present invention has been described in detail, those skilled in the art should understand that they can make various changes, substitutions and alterations herein without departing from the spirit and scope of the invention in its broadest form.

What is claimed is:

1. A mobile station capable of being upgraded by a delta file received from a software upgrade server via a wireless network, said mobile station comprising:

a memory capable of storing an original image file and said delta file, wherein said delta file is suitable for upgrading said original image file; and a controller associated with said memory capable of communicating with said software upgrade server via said wireless network, wherein said controller transmits to said software upgrade server information associated with said original image file, including a target address in said memory, and receives said delta file generated in accordance with said information, and wherein said controller is further capable of modifying said original image file according to instructions stored in said delta file to thereby generate said upgraded image file in said memory.

2. The mobile station as set forth in claim 1 wherein said target address indicates a starting point of said original image file in said memory.

3. The mobile station as set forth in claim 1 wherein said information includes a version indicia identifying a current version of said original image file.

4. The mobile station as set forth in claim 3 wherein said controller transmits said information to said software upgrade server in response to a notification message received from said upgrade server.

5. The mobile station as set forth in claim 3 wherein said controller transmits said information to said software upgrade server in response to a user prompt received from an operator of said mobile station.

6. The mobile station as set forth in claim 3 wherein said controller transmits said information to said software upgrade server in response to expiration of a timer.

7. The mobile station as set forth in claim 6 wherein said delta file comprises at least one checksum value associated with said new image file.

8. The mobile station as set forth in claim 1 wherein said delta file comprises a file size associated with said new image file.

9. The mobile station as set forth in claim 1 wherein said controller determines from said at least a first message received from said software upgrade server a file size of said upgraded image file.

10. The mobile station as set forth in claim 1 wherein said controller is capable of transmitting an upgrade request message to said software upgrade server requesting a list of available software files capable of being executed by said mobile station.

11. For use in a mobile station capable of being upgraded by a delta file received from a software upgrade server via a wireless network, a method of upgrading an original image file stored in a memory of the mobile station comprising the steps of:

transmitting to the software upgrade server information associated with the original image file, including a target address in the memory;

receiving from the software upgrade server a delta file generated in accordance with the information and capable of upgrading the original image file stored in the memory of the mobile station;

storing the delta file in the memory of the mobile station; and modifying the original image file according to instructions stored in the delta file to thereby generate the upgraded image file in the memory of the mobile station.

12. The method as set forth in claim 11 wherein the target address indicates a starting point of the original image file in the memory.

13. The method as set forth in claim 11 wherein the information further includes a version indicia identifying a current version of the original image file.

14. The method as set forth in claim 13 wherein the step of transmitting to the software upgrade server information associated with the original image file is done in response to a notification message received from the upgrade server.

15. The method as set forth in claim 13 wherein the step of transmitting to the software upgrade server information associated with the original image file is done in response to a user prompt received from an operator of the mobile station.

16. The method as set forth in claim 13 wherein the step of transmitting to the software upgrade server information associated with the original image file is done in response to expiration of a timer.

17. The method as set forth in claim 13 wherein the delta file comprises a file size associated with the upgraded image file.

18. The method as set forth in claim 17 wherein the delta file comprises at least one checksum value associated with the upgraded image file.

19. The method as set forth in claim 11 further comprising the step of transmitting an upgrade request message to the software upgrade server requesting a list of available software files capable of being executed by the mobile station.

20. A software upgrade server capable of upgrading a wireless mobile station via a wireless network, said software upgrade server comprising:

a database capable of storing a plurality of software upgrade files as a plurality of object files and a plurality of image files suitable for use in said wireless mobile station; and an upgrade controller associated with said database capable of communicating with said mobile station via said wireless network, wherein said upgrade controller receives from said mobile station a select message selecting one of said plurality of software upgrade files and a target address associated with an original image file in a memory of said mobile station and said upgrade controller, in response to receipt of said target address, links selected ones of said plurality of object files to form a dynamically linked library (DLL) file based on said target address, and wherein said upgrade controller retrieves from said database a copy of said original image file and generates a delta file corresponding to differences between said original image file and said DLL file and transmits said delta file to said wireless mobile station.

21. The software upgrade server as set forth in claim 20 wherein said target address indicates a starting point of said original image file in said mobile station memory.

22. The software upgrade server as set forth in claim 20 wherein said upgrade controller is capable of transmitting to said wireless mobile station a notification message operable to cause said wireless mobile station to transmit said version indicia to said software upgrade server.

23. The software upgrade server as set forth in claim 20 wherein said upgrade controller is capable of receiving an upgrade request message from said mobile station requesting a list of ones of said plurality of software upgrade files capable of being executed by said mobile station.

24. For use in a software upgrade server, a method of upgrading a wireless mobile station via a wireless network comprising the steps of:

storing in a database a plurality of software upgrade files as a plurality of object files and storing in the database a plurality of image files suitable for use in the wireless mobile station; and receiving from the mobile station a select message selecting one of the plurality of software upgrade files and a target address associated with an original image file in a memory of the mobile station;

in response to receipt of the target address, linking selected ones of the plurality of object files to form a dynamically linked library (DLL) file based on the target address;

retrieving from the database a copy of the original image file;

generating a delta file corresponding to differences between the original image file and the DLL file; and transmitting the delta file to the wireless mobile station via the wireless network.

\* \* \* \* \*